United States Patent [19]

Bietzer et al.

[11] Patent Number: 5,664,694

[45] Date of Patent: *Sep. 9, 1997

[54] FOIL LINED SNAP-ON, SCREW-OFF CLOSURE AND CONTAINER NECK

[75] Inventors: Steven H. Bietzer, Sunnyvale; Rawson L. Chenault, Newark; Daniel Luch, Morgan Hill; Richard E. Repp, San Jose, all of Calif.

[73] Assignee: Portola Packaging, Inc., San Jose, Calif.

[*] Notice: The portion of the term of this patent subsequent to Sep. 25, 2012, has been disclaimed.

[21] Appl. No.: 664,101

[22] Filed: Jun. 11, 1996

Related U.S. Application Data

[63] Continuation of Ser. No. 274,911, Jul. 14, 1994, abandoned, which is a continuation-in-part of Ser. No. 951,653, Sep. 25, 1992, Pat. No. 5,415,306, which is a continuation-in-part of Ser. No. 830,133, Jan. 31, 1992, Pat. No. 5,267,661, which is a continuation-in-part of Ser. No. 772,945, Oct. 8, 1991, Pat. No. 5,213,224, which is a continuation-in-part of Ser. No. 565,638, Aug. 9, 1990, Pat. No. 5,190,178.

[51] Int. Cl.⁶ .................................................. B65D 39/00
[52] U.S. Cl. ...................... 215/256; 215/232; 215/318; 215/351; 220/258; 220/270; 220/276; 220/359
[58] Field of Search ........................ 215/232, 252, 215/253, 254, 256, 318, 344, 349, 350, 351; 220/258, 270, 276, 359

[56] References Cited

U.S. PATENT DOCUMENTS

| | | | |
|---|---|---|---|
| 3,902,621 | 9/1975 | Hidding | 215/252 |
| 3,980,195 | 9/1976 | Fillmore | 215/256 |
| 4,354,609 | 10/1982 | Hidding | 215/252 |
| 4,448,319 | 5/1984 | Kern | 215/329 |
| 4,531,649 | 7/1985 | Shull | 215/232 |
| 4,722,447 | 2/1988 | Crisci | 215/232 |
| 4,815,617 | 3/1989 | Cullum | 215/232 |
| 4,872,571 | 10/1989 | Crecelius et al. | 215/232 |
| 5,052,568 | 10/1991 | Simon . | |
| 5,099,998 | 3/1992 | Curzon et al. . | |
| 5,121,845 | 6/1992 | Blanchard . | |
| 5,184,746 | 2/1993 | Moore et al. . | |
| 5,197,621 | 3/1993 | Bartl et al. | 215/331 |

FOREIGN PATENT DOCUMENTS 2 114 553  8/1983  United Kingdom .

*Primary Examiner*—Stephen K. Cronin
*Attorney, Agent, or Firm*—Julian Caplan; Flehr Hohbach Test Albritton & Herbert LLP

[57] ABSTRACT

A tamper-evident, snap-on, screw-off closure which is used with a specially shaped container neck is provided with a foil liner. Once the closure is applied to the neck, the foil liner is sealed to the neck of the container. The foil liner includes a tab for removal of the seal disc from the neck. The closure is characterized by the absence of a second liner between the top of the cap and the foil liner. The closure, neck and the foil liner are formed to inhibit adherence of the tab to the cap interior and the neck exterior.

49 Claims, 3 Drawing Sheets

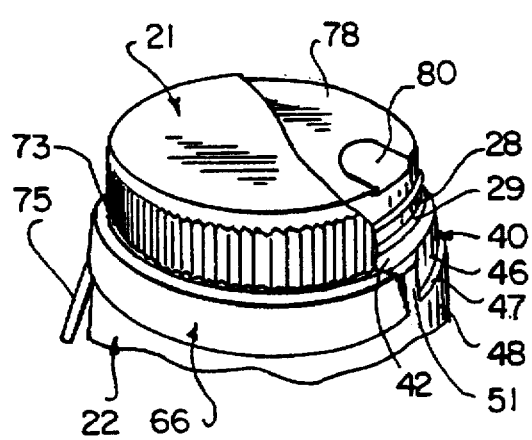
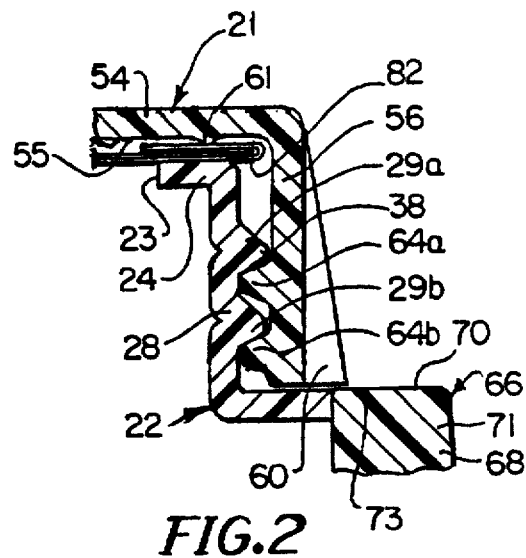
FIG.1  FIG.2
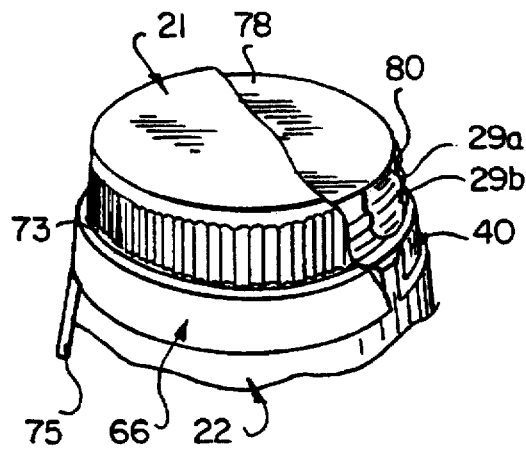
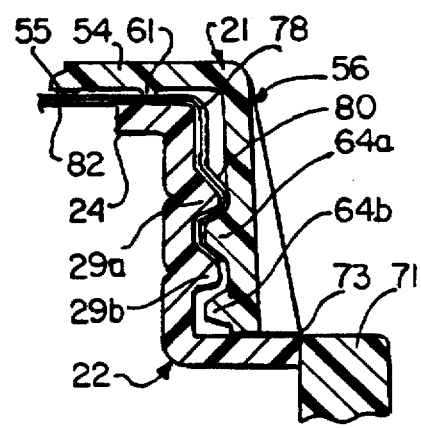
FIG.3  FIG.4
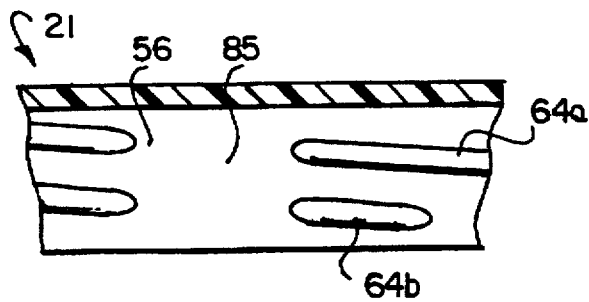
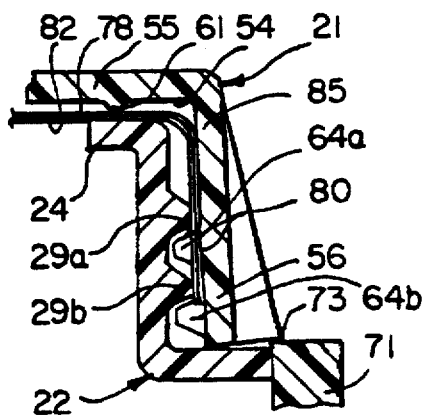
FIG.6  FIG.5

FOIL LINED SNAP-ON, SCREW-OFF CLOSURE AND CONTAINER NECK

CROSS-REFERENCE TO RELATED APPLICATIONS

This is a continuation of application Ser. No. 08/274,911 filed Jul. 14, 1994 now abandoned which is a continuation-in-part of U.S. application Ser. No. 07/951,653, filed Sep. 25, 1992 now U.S. Pat. No. 5,415,306, which is a continuation in part of U.S. application Ser. No. 07/830,133, filed Jan. 31, 1992, now U.S. Pat. No. 5,267,661, which is a continuation-in-part of U.S. application Ser. No. 07/772,945, filed Oct. 8, 1991, now U.S. Pat. No. 5,213,224, which is a continuation-in-part of U.S. application Ser. No. 07/565,638, filed Aug. 9, 1990, now U.S. Pat. No. 5,190,178. The disclosures of the abovementioned applications are hereby incorporated herein by reference.

BACKGROUND OF THE INVENTION

1. Field of the Invention

The present invention relates in general to a tamper-evident closure system for sealing a container. More particularly, the present invention relates to a container neck and a closure with a seal disc for sealing the container.

Many closure systems include foil liner seals to cover the neck opening, providing evidence of tampering and preserving the freshness of the product. The commercially available foil seals usually have an adhesive substance applied on one surface of the seal. When applied to the neck, the adhesive-coated surface is placed in contact with the neck structure surrounding the opening. The foil seal discs are generally adhered to the container by induction heating or other means. The foil disc is typically initially inserted into the cap and sealed to the neck of the container during the capping process, facilitating installation of the liner seal.

Many of the available foil liner seals are formed with a tab which may be gripped by the consumer to remove the seal and open the container. As is shown in U.S. Pat. No. 4,739,891, the tab is folded back across the main body of the foil disc when inserted into the closure. A paper liner preferably separates the foil disc from the interior of the cap, preventing adherence of the tab to the underside of the cap when the foil disc is sealed to the neck. Without the paper liner, the tab may bond to the cap and may pull the foil disc from the neck when the cap is initially opened. The premature breaking of the seal provides a false indication of tampering. U.S. Pat. No. 4,872,571 shows a peelable tamper proof seal which is sealed to the circumferential lip of a spout. A pull tab extending from the seal is positioned in a vertical groove on the spout exterior so that when the cap is applied to the spout, the internal threads of the cap do not engage the pull tab. However, separately applying the seal and the cap as taught in U.S. Pat. No. 4,872,571 is time consuming and inefficient.

The snap-on, screw-off structures available in the prior art are of two general types—those having thread engagement as initially applied, and those without initial thread engagement. Examples of closure systems having no—thread initial engagement are those taught by U.S. Pat. No. 4,561,553 to Crisci, and U.S. Pat. No. 4,946,055 to Towns et al. The no-thread initial engagement system has the major advantages of being simple to manufacture and apply and of achieving good re-seal on reclosure through the thread torque. However, using a foil disc initially inserted in the cap with this system is impractical. Furthermore, the requirement of twisting the closure relative to the neck after the container is initially opened by a lifting motion is confusing to the consumer.

Systems having partial to full thread engagement on initial application have several advantages over the no-thread system, including the ability to effectively use a foil disc to seal the neck of the container. Consumer confusion is also eliminated, since the cap is initially removed from the container by twisting. However, the initial thread engagement systems do not offer the manufacturing and application advantages available with the no-thread system. With some systems, the closure must be twisted relative to the container at some point during the application process in order to seat the cap on the neck. An example of such a closure is shown in U.S. Pat. No. 4,625,875 to Carr. Other concepts, such as that taught by Miskin in the European Patent Specification No. 0 118 267 do not require orientation or twisting during application, and accommodate the inevitable closure bottle finish height variation after application by employing an extended plug to seal against the inside bore of the container neck. The systems taught by Carr and Miskin both suffer from the requirement that the tamper evident band must be expanded over a restrictive container bead during the application process, which leads to difficulties. Furthermore, the bridges joining the removable band to the cap require mold slides for formation, a feature which greatly increases the cost and complexity of injection molding tooling.

Other systems available in the art include screw-on, screw-off structures which also offer the advantages of initial thread engagement and elimination of consumer confusion. An example of this type of closure is shown in U.S. Pat. No. 3,980,195 to Fillmore. The system taught by Fillmore includes a threaded, tamper-evident closure with a removable band. The interior of the removable band is formed with a one-way ratchet, which cooperates with projections formed on the neck to prevent unscrewing of the container. When the closure is initially twisted onto the container, the ratchet teeth slip over the projections on the neck. The application process used with the screw-on, screw-off systems is quite complex, since the cap must be turned or rotated relative to the container until the closure is fully seated. Furthermore, the frangible connections between the tamper-evident band and the closure must be sufficiently strong to prevent partial separation when the cap is twisted onto the container, increasing the costs of manufacture and the difficulty with which the band is removed from the container.

This invention provides a snap-on, screw-off system with partial or full thread initial engagement by reason of a unique thread design, a unique tamper-evident band and optional means for orienting the closure and container threads to achieve registration prior to straight axial application. A foil disc seals the neck opening of the container, providing evidence of tampering. The present invention offers considerable advantages over prior structures as is evident from the description of the related art and the following description of the invention.

SUMMARY OF INVENTION

The present invention comprises an improved closure or cap and an improved neck finish, with which a seal disc is used to seal the neck opening of the container. The cap skirt and neck finish are of the type having mating threads of such shape that the cap may be applied in a simple downward vertical movement without relative rotation, the cap skirt flexing sufficiently to permit the threads to slip past each other.

The neck finish of the present invention includes a downward extending neck stretch portion having at least one helical thread formed on the neck exterior. The closure has a downward extending upper skirt portion depending from a top, the upper skirt portion being adapted to fit over the neck stretch portion. At least one helical thread is formed on the interior of the upper skirt portion, and is shaped to mate with the helical thread formed on the neck.

The closure of the present invention is applied to the neck in a direct, axial downward direction without relative rotation of the neck and the closure. The helical threads are shaped, and the closure is resilient, so that the threads will slip past each other and interengage when the closure is directly applied to the container. The interengagement of the threads requires that the closure be unscrewed for removal from the container. To provide external evidence of tampering with the contents of the container, the neck includes a tamper-evident structure which cooperates with a tamper-evident structure on the closure. The tamper-evident structures interengage when the closure seats on the neck to restrain unscrewing of the closure with the tamper-evident structures intact.

A seal disc is positioned underneath the top of the cap, and is formed for covering the neck opening of the container. Once the cap is applied to the container, the seal disc is caused to be substantially sealed to the lip surrounding the neck opening. The seal disc provides further evidence of tampering, as the consumer must remove the disc from the neck when initially opening the container. A tab joined to the seal disc assists the consumer in removing the disc from the neck.

The closure of the present invention is characterized by the absence of a liner positioned to prevent bonding between the seal disc and the underside of the cap top. In the preferred forms, the cap and the seal disc are formed to inhibit the adherence of the tab to the interior of the cap. In one modification, the tab is folded back across the seal disc when inserted into the closure. The closure may include a rib protruding from the underside of the cap, partially separating the tab from the underside of the cap top and substantially preventing the formation of an adhesive bond between the cap and the tab. In other modifications, at least one recessed portion is formed in the closure, the neck, or in both the closure and the neck. When the closure has a recessed potion, the tab depends from the peripheral edge of the seal disc and is positioned between the neck stretch portion and the interior of the upper skirt when the cap is applied to the neck. This positioning provides the means to inhibit adherence of the tab to the underside of the top. If the cap and neck are each formed with a recessed portion, the tab is positioned in the substantially aligned recessed portions when the closure is applied to the neck.

The closure may be formed having an orientation structure, such as a tear tab, for aligning the closure relative to the container. Similarly, the container may include an orientation structure, such as a non-circular cross section, for orienting the container with respect to the closure. The orientation features may be used to achieve complete thread engagement during straight axial application. Achieving full thread engagement allows the seal disc to be accurately positioned surrounding the opening and further ensures that the disc will completely adhere to the lip of the neck. Also, orienting the closure relative to the container neck substantially aligns the tab of the seal disc with a recessed portion formed in the neck.

If the consumer is not concentrating on the condition of the cap when opening a container, he may not notice that the frangible section has been fractured indicating that the cap has been previously removed from the container. The seal disc of the present invention provides additional evidence of tampering. If the seal disc is missing or partially removed from the neck, the consumer is alerted to potential tampering with the contents of the container. Thus, evidence of tampering may be detected by even the inattentive consumer.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a perspective view of a cap and foil disc on a container neck, shown with the cap partially broken away.

FIG. 2 is a fragmentary, enlarged sectional view of a cap and foil disc applied to a neck.

FIG. 3 is a perspective view of an alternative embodiment of a cap and foil disc applied to a container neck, shown with the cap partially broken away.

FIG. 4 is a fragmentary, enlarged sectional view of a cap and foil disc applied to a neck.

FIG. 5 is a fragmentary, enlarged sectional view of another embodiment of a cap and foil disc applied to a neck.

FIG. 6 is a fragmentary, enlarged sectional view of the interior of a cap.

DETAILED DESCRIPTION OF THE PREFERRED EMBODIMENTS

Figure 7:
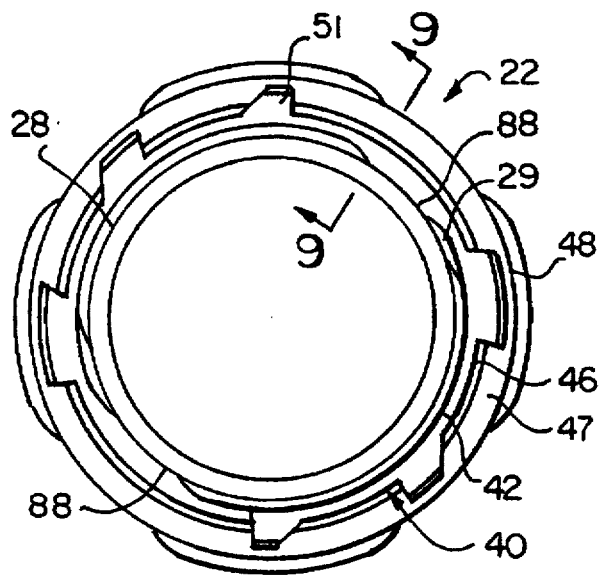
FIG. 7 is a top plan view of another embodiment of a neck.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Closure 21, hereinafter described in detail, is used with a container neck 22. The closure 21 and the neck 22 are subject to some variation, but preferably are formed for direct, axial application without relative rotation of the closure and the container. The interior of the neck 22 forms no part of the present invention. With a blow-molded bottle finish, the interior contour tends to follow that of the neck exterior. However, it will be understood that other types of bottles may be used, with the internal shape of the neck varying from that of the exterior.

As is shown particularly in FIGS. 2 and 4, neck 22 has a central opening 23 and a lip 24 surrounding the opening 23 and terminating in a neck stretch portion 28. In the present modification, the lip 24 comprises an annular lip flange; however, it should be understood that the lip may take other forms as for example the upper edge of neck stretch portion 28. Helical engagement means, such as threads 29, extend outward of stretch 28. In the illustrated embodiment, there are two threads 29a and 29b. The finish has twelve threads per inch with a double lead, each thread being six pitch and extending slightly in excess of 360° of a full thread. It is to be understood that the threads may be extended greater than 360° for increased thread engagement. Additionally, the thread leads may be of a different linear thread density (threads per inch). The threads may be continuous or interrupted, or may be replaced with other engagement means such as a cooperatively shaped groove. The shape of the threads 29 permits the threads on the interior of the cap to slip past and interengage threads 29. Preferably, the thread apex 38 is made with as large a radius as possible, allowing direct axial application of cap 21 while requiring that the cap be unscrewed and not pulled from the neck.

In the illustrated form, the container neck also includes tamper-evidencing means, such as locking wall portion 40 below the vertical stretch having a plurality of exterior ratchet teeth 51. The locking wall portion has an outward extending shoulder portion 42 and a lower neck stretch portion 46 offset outwardly relative to the upper neck stretch portion. In the illustrated embodiment, the lower neck portion slants downwardly/outwardly at an angle of approximately 10° and terminates in shoulder stretch portion 47. A vertical stretch 48 depends from shoulder 47.

The ratchet teeth 51 are shaped to interengage the internal ratchet teeth formed on the cap, preventing twisting of the cap relative to the neck. In the illustrated embodiments, teeth 51 are formed on shoulder stretch 47. However, in alternative forms of the present invention the teeth may be located on lower stretch 46, interengaging ratchet teeth formed on the interior of the cap.

A cap 21 for use with neck structure 22 is illustrated in FIGS. 1 to 4. The cap has a top 54 from the periphery of which depends downward extending upper skirt 56. The top as illustrated comprises a generally flat top disk; however, other configurations such as a dome shape may be substituted. The exterior of upper skirt portion 56 has spaced vertical ribs 60 to enable the user to grip the cap. An annular rib or bead 61 protrudes from the underside 55 of top 54. When the cap 21 seats on the neck, rib 61 is positioned directly above lip 24.

Helical engagement means, such as threads 64a and 64b, are formed on the interior of the skirt. The threads are selected to mate with threads 29 of neck 22, with the shape of threads 29a, 29b, 64a and 64b allowing the threads to slip past one another and then interengage. The helical engagement means may be provided by continuous threads, interrupted threads or alternate engagement means. Threads 64a and 64b are double lead and extend around the circumference of the cap in excess of 180°, for example, approximately 200°. In conventional cupping machines, cap 21 is deposited on neck 22. Since threads 64a, 64b are diametrically opposed, the cap tends to rest horizontally on neck 22, facilitating the application of the cap onto the neck with a downward, axial force.

In order for the closure and container threads to effectively slip past each other during direct axial application, the threads must be finer than those of a threaded closure applied by conventional rotary application. As threads become finer, a greater amount of total thread engagement is often necessary to prevent excessive forward stripping on reapplication. A thread engagement of approximately 200° for each of the two cap threads is satisfactory for the present embodiment (i.e. 400° of total thread engagement), where the threads are double lead and formed with a thread density of twelve turns per inch. Finer threads, such as sixteen or twenty threads per inch, would require greater total thread engagement.

The closure 21 has tamper-evidencing means, for example a tamper-evident band 66 having a number of ratchet teeth 68 formed on the interior of the band. In the present embodiment, the tamper-evident band comprises an annular shoulder 70 below the upper skirt 56, and a lower skirt portion 71 extending downward from the annular shoulder. The tamper-evident band 66 is frangibly connected to the upper skirt by a number of radially spaced bridges 73. In the present form, the bridges 73 are provided by the lower edges of ribs 60. Alternatively, a line of weakness may be formed through the intersection of shoulder 70 and upper skirt 56. The ratchet teeth 68 are shaped and positioned for cooperation with the teeth 51 formed on neck 22. When the cap 21 is pushed onto the neck, the teeth 51 and 68 interengage to prevent unscrewing of the cap with the tamper-evident band 66 intact.

The interlocking engagement between the teeth on the cap with those on the neck prevents twisting of the cap relative to the container while the tamper-evident band 66 is intact. The container is initially opened by rupturing the bridges 73 and separating the tamper-evident band 66 from the upper skirt portion 56. The cap may then be unscrewed and band 66 removed. The presence of the ruptured bridges alerts the consumer that the container has been previously opened, providing evidence of tampering with the contents.

In the preferred form, a tear tab 75 is joined to the lower edge of the tamper-evident band 66. The tear tab provides means for removing the lower band and may also be used to orient cap 21 relative to the container prior to application. When initially opening the container, the consumer pulls tab 75 to remove the tamper-evident band 66, rupturing frangible section 73. The absence of the lower skirt provides a more pronounced warning to the consumer that the container has been previously opened and possibly tampered with. In the preferred form, the tamper-evident band 66 is completely removed from upper skirt 56. However, in other forms of the present invention the lower band may be only partially removed from the upper skirt portion for separating teeth 51 from teeth 68 to unscrew the cap from the container.

When initially opening a container, the consumer grips tab 75 and pulls circumferentially around the container detaching the tamper-evident band from upper skirt 56. Ratchet teeth 68 are thereby removed from interlocking engagement with projecting teeth 51, enabling the consumer to unscrew cap 21 from neck 22. To replace the cap, the consumer merely reverses the direction of twisting.

Foil sealing disc or liner 78 seals the central opening 23 of neck 22. The foil sealing disc is of a commercially available type, and generally includes a tab 80 for removal of the disc from the container neck. In the preferred embodiment, the tab is integrally formed with and extends from the peripheral edge of seal disc 78. Before applying the closure 21 to the neck, the seal disc is inserted into the cap, fitting against the underside 55 of the top 54. The sealing disc is loosely retained within the cap by threads 64a and 64b until the cap is applied to the container. The bottom of the sealing disc is provided with an adhesive layer 82 which bonds with the lip 24 when applied to the container. In the present form, the adhesive layer is a heat sensitive compound. The compound adheres to the surface of the lip upon the application of heat, as by induction heating or another known method. Alternatively, the heat sensitive compound may be replaced by other known means for sealing the foil liner 82 to the container, for example pressure sensitive adhesives.

With the present invention, the upper surface of the sealing disc is substantially exposed to the underside of the top 54. Unlike other available foil-lined closures, cap 21 does not include a back-up liner separating the seal disc from the underside of the cap. Instead, the closure and the seal disc are formed to prevent bonding between the seal disc and the cap. In the illustrated form shown particularly in FIG. 1., tab 80 is folded back across seal disc 78. The bottom surface of the tab, which is at least partially covered by the adhesive coating 82, is exposed. When the cap is applied to the container and the disc 78 is sealed to the lip, the exposed surface of the tab will slightly adhere to the underside of top 54.

Cap 21 is initially removed by unscrewing the cap from the container. Means are provided to limit bonding between the tab 80 and the underside 55 of the top and it will be sheared by the twisting of the cap. Since the tab is separated from the cap interior before the cap is lifted from the container, the seal between disc 78 and lip 24 will not be broken. Thus, the seal disc remains intact without requiring the use of a secondary or back-up liner for separating the tab from the underside of the top 54.

In one form of the present invention, bead 61 depending from the underside of the top 54 is positioned above the lip 24. As is shown particularly in FIG. 2, bead 61 rests against tab 80 when the cap is applied to the neck, effectively separating the adhesive-coated surface from the top 54 of the cap. The adhesive layer 82 on the exposed surface of the tab 80 may slightly adhere to the bead when the disc 78 is sealed to the lip 24 of neck 22; however, the tab is substantially prevented from bonding to the underside of the top by bead 61. The size and strength of the adhesive bond between the seal disc and the cap is significantly minimized, since the tab 80 solely adheres to the bead 61. The bead 61 thereby provides a means for inhibiting the adherence of the seal disc to the cap 21. Unscrewing of the cap will easily shear the bond between the bead 61 and the tab 80, preventing any premature removal of the seal disc 78. Thus, providing cap 21 with the bead 61 further eliminates the need for a secondary or back-up liner.

Bead 61 preferably extends circumferentially around the underside of top 54. The annular bead 61 enhances the application of the seal disc 78 to the neck. Once the cap is seated on the neck, the bead presses the outer edges of the seal disc against lip 24, ensuring contact between the adhesive layer 82 and the neck. The bead further concentrates the application of heat, directing the heat toward the weld area. The adhesive bond formed between the disc 78 and the lip 24 extends entirely around the central opening 23 of the neck. Thus, the seal disc completely seals the container, protecting the consumer by providing evidence of tampering.

A modified form of the present invention is shown in FIGS. 3 and 4. Tab 80 is now folded to depend from the peripheral edge of the seal disc, where it extends across the cap threads 64a and 64b when the disc 78 is inserted into cap 21. When the cap is applied to the neck, the tab is positioned between the threads 29a, 29b, 64a and 64b. The positioning of the tab 80 substantially inhibits the formation of an adhesive bond between the interior of the cap and tab 80.

Since the adhesive-coated surface of the tab 80 is not exposed to the underside of the top, the tab will not adhere to the cap when the disc 78 is sealed to the lip of the container. A consumer initially opening a container will unscrew and remove cap 21, exposing the seal disc. Disc 78 is then conveniently removed by gripping tab 80 and pulling the seal disc from the neck. Since the tab does not adhere to the interior of the cap, the seal disc will not be prematurely removed from the neck with the cap.

With the present form, the adhesive-coated surface of the tab is exposed to the neck stretch portion 28, and the tab is held between the interengaged threads 29a, 29b, 64a and 64b. The orientation of the tab 80 relative to the seal disc 78 and the shape of the threads 29a and 29b inhibits adherence of the tab to the neck. It has been observed that the aggressiveness of the bond between adhesive layer 82 and neck 22 is reduced by the vertical orientation of tab 80.

In the preferred form, seal disc 78 is inserted into cap 21 with tab 80 oriented opposite tear tab 75. With the capping machines known in the bottling art, the neck of a container passing below the capping machine contacts lower skirt portion 71 to "pick" or catch cap 21, positioning the cap on neck 22 with tear tab 75 trailing. When the tab 80 is positioned adjacent tear tab 75, the tab 80 may accidentally be inserted into opening 23 during the capping process. Orienting seal disc 78 with the tab 80 positioned 180° relative to the tear tab 75 substantially prevents the tab 80 from falling within neck opening 23.

Another modification of the present invention is shown in FIGS. 5 and 6. The interior of the upper skirt portion 56 is formed with a recessed portion, generally designated at 85. The recessed portion is defined by interruptions in closure threads 64a and 64b. Seal disc 78 is inserted into the cap 21 with tab 80 depending from the disc proximate the recessed portion 85. As is shown particularly in FIG. 5, once the cap is seated on the neck, the tab 80 is positioned between the interior wall of the upper skirt portion and neck threads 29a and 29b the tab 80 does not extend across threads 64a and 64b. Since it fits within the recessed portion 85, tab 80 is not deformed to follow the shape of the interengaged threads. Instead, the tab 80 solely contacts thread apex 38.

When the seal disc is adhered to lip 24, the adhesive-coated surface of tab 80 could adhere to the neck threads 29a and 29b. However, since the tab only contacts the thread apex, the size and strength of the adhesive bond is substantially minimized. A consumer may easily shear any bond between the tab 80 and the neck simply by lifting the tab. Thus, the consumer is provided with convenient access to the tab 80 for efficiently removing seal disc 78 to initially open the container.

Figure 8:
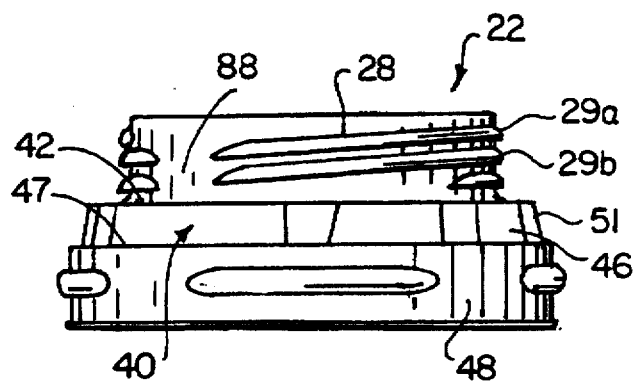
FIG. 8 is a side elevational view of the neck.
Figure 9:
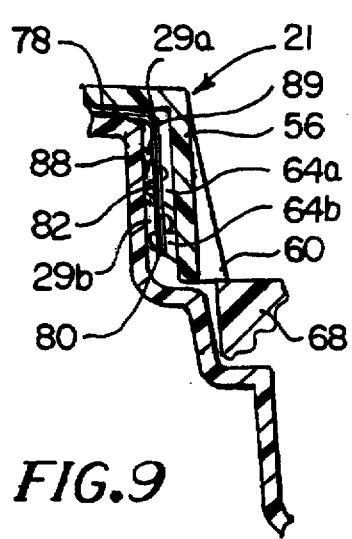
FIG. 9 is an enlarged, fragmentary sectional view taken along line 9—9 of FIG. 7, shown with a cap and a foil disc applied to the neck.

A modification of the neck is shown in FIGS. 7-9. The exterior of neck stretch 28 is formed with at least one gap or recessed portion, generally designated at 88, defined by interruptions in neck threads 29a and 29b. The generally vertically extending recessed portion 88 is shaped to receive tab 80 of the foil seal disc 78. The width of recessed portion 88 is preferably slightly larger than the width of the tab 80 to minimize the extent of the neck thread interruptions. If desired, however, the recessed portion 88 may have a width substantially greater than the width of the tab 80 to increase the neck area formed for receiving the tab, thereby accommodating some variation in the placement of the tab. As shown in FIG. 7, neck 22 includes two recessed portions 88 for receiving tab 80. When the closure is applied to the neck, tab 80 of the foil disc may be positioned in either of the recesses 88 depending upon the orientation of the container relative to the closure. Providing the neck stretch 28 with two diametrically opposed recesses 88 is preferred for symmetry since in the present form the threads 29a and 29b are double lead. However, it should be understood that the neck may also be formed with only one recess 88 or with more than two recesses 88.

As is shown in FIG. 9, the modified neck 22 is preferably used with the closure 21 shown in FIGS. 5 and 6. The closure 21 is oriented relative to the container neck with recessed portion 85 substantially aligned with one of the recessed portions 88 in the neck. The aligned recessed portions 85 and 88 define a space between the interior of the upper skirt 56 and the exterior of the neck stretch 28. As described above in relation to FIGS. 5 and 6, seal disc 78 is inserted into the closure with the tab 80 next to recessed portion 85. When the closure is applied to the neck, the tab is positioned between the interior of the upper skirt and the exterior of the neck stretch; the tab 80 does not extend across either neck threads 29a and 29b or closure threads 64a and 64b.

With the illustrated modification, the adhesive-coated surface of the tab 80 fits within recessed portion 88 and is therefore separated from the neck threads 29a and 29b. In some instances, the adhesive-coated surface of the tab may lightly touch the exterior of the neck stretch, slightly adhering the tab to the neck exterior. The strength of any adhesive bond formed between the tab and the neck exterior will be minimal, allowing a consumer to easily lift the tab and pull the foil disc from the neck. Thus, one advantage of the illustrated modification is that the presence of the recessed portions 85 and 88 in the closure interior and the neck exterior essentially eliminates adherence of the tab 80 to the container neck.

When the cap 21 is removed from a neck having a traditional finish, the foil tab 80 may be pressed into the neck threads 29a and 29b by the cap threads 64a and 64b. The consumer removes the foil seal by first prying the tab from the neck threads. The tab typically may be separated from the neck without much difficulty as the tab has not been adhered to the neck threads only "pressed" to conform to them. However, in some instances separating the tab from the threads 29a and 29b may be inconvenient and time consuming, particularly if the consumer has short fingernails. Positioning tab 80 in recessed portion 88 ensures that the cap threads will not press the tab into the neck threads when the closure 21 is removed. Thus, with the tab retained in recessed portion 88, the consumer may conveniently and easily grasp the tab and remove the foil seal disc 78.

As is shown particularly in FIG. 9, when the seal disc is applied to neck 22, the tab depends from the seal disc into the space defined by recessed portions 85 and 88. With recessed portion 85, the tab is positioned between the exterior of the neck stretch and the interior of upper skirt 56. The proximity of the tab 80 to the neck stretch exterior depends upon the radius of curvature of bend 89. If the tab is spaced from the exterior of the neck, thread leads 90a and 90b (FIG. 6) will contact the tab 80 and urge the tab inwardly against the exterior of the neck stretch as the closure is unscrewed. Alternatively, the bend 89 may have a smaller radius of curvature so that the tab extends along the neck exterior when the seal disc is applied to the neck. Since the tab 80 is retained in recessed portion 88, the closure threads 64a and 64b will not interfere with the tab when the closure is twisted to open the container.

Figure 10:
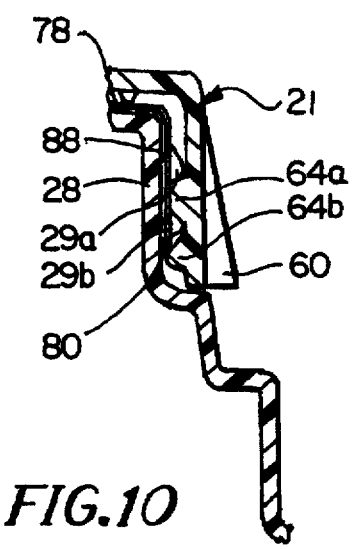
FIG. 10 is an enlarged, fragmentary sectional view similar to FIG. 9, shown with another cap applied to the neck.

As is shown in FIG. 10, the modified neck 22 may also be used with other closures as for example a cap similar to the closure shown in FIGS. 1-4. As described above in relation to FIGS. 3 and 4, the tab is folded to depend from the peripheral edge of the seal disc, which is positioned in the closure with the tab 80 extending across cap threads 64a and 64b. The closure 21 is oriented relative to the modified neck 22 with the tab 80 substantially aligned with recessed portion 88 so that when the cap is applied to the neck, the tab is positioned in the recessed portion 88. Although the adhesive-coated surface of the tab contacts the neck exterior, the size and strength of any bond formed between the tab and the neck will be minimal. Once the closure has been removed, the consumer may easily lift the tab from the recessed portion and remove the seal disc from the neck 22.

The foil seal disc 78, which is applied to the neck to seal the container, is a tamper-evident feature of the container. If the seal disc is missing when the closure is initially removed from the container, the consumer is alerted that someone has previously opened the container and possibly tampered with the contents. In the preferred embodiment, the closure and neck include tamper-evidencing means such as the teeth 51 and 68 formed on the locking wall 40 and lower skirt 71, respectively, with the foil seal disc 78 providing secondary tamper-evidencing means. As shown in FIG. 10, the teeth 51 and 68 may be omitted, with the foil disc providing the primary tamper-evidencing means.

Figure 12:
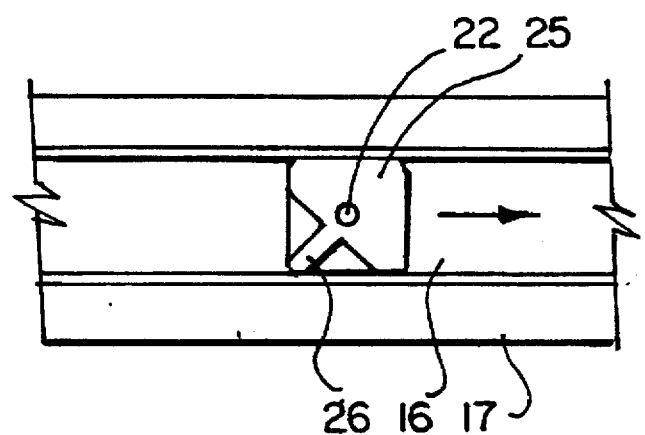
FIG. 12 is a partial top plan view of a capping machine, showing a container positioned on the conveyor belt.

With the present invention, the closure may be conveniently oriented relative to the container prior to applying the closure to the neck. When a recessed portion 88 is formed in the neck, the closure and container are preferably oriented so that the tab 80 is positioned in recessed portion 88. As described above, the tear tab 75 provides orientation means for orienting the closure relative to the container. The container 25 also has orientation means as for example a non-circular cross section (FIG. 12). The container may have some other variation from a round shape or some other orientation means for orienting the container relative to the closure. The tear tab 75 and the non-circular cross section of the container are directed by the capping machine during the capping process to orient the cap and container so that the tab 80 may be positioned in recessed portion 88.

In the present modification, the container has a generally square cross section with four substantially similar sides. The container may be oriented in one of four positions relative to the closure. Since the neck stretch 28 has two recessed portions 88, the tab 80 will be aligned with a recessed portion 88 when the container is oriented in one of two positions relative to the closure. Various methods may be employed to ensure that the container is oriented with one of the recesses 88 aligned with the tab 80 of foil seal disc 78. For example, in the present form the container includes a handle 26 which may be used to determine in which of the four positions the container is oriented. Alternatively, other means may be employed to determine the orientation of the container. Improperly oriented containers may be automatically or manually identified before applying the cap and rotated 90° to align a recessed portion 88 with the foil tab 80.

In the preferred form the cap and neck are oriented to substantially align recessed portion 85 with recessed portion 88; however, if the cap does not include a recessed portion, the tab 80 of the foil seal disc is substantially aligned with the recessed portion 88. The substantially aligned recessed portions 85 and 88 define a space between the neck stretch exterior and the upper skirt interior for receiving the tab 80 of the foil seal disc. When fully applied, the interengagement between the teeth 51 and 68 will prevent unscrewing of the cap with the tamper-evident portion intact. By first orienting the cap, full thread engagement may be achieved once the cap is pushed onto the neck.

In many instances, full thread engagement or complete interengagement of the teeth 51 and 68 is not necessary to securely retain the cap on the container. Additionally, the cap construction fosters substantial seating of the cap without prior orientation. For example, the tamper-evidencing means of the closure and neck are cooperatively shaped to slip past one another, thereby guiding the teeth 68 formed on the closure into interengagement with the teeth 51 formed on the neck. Thus, the various features of the present invention are not to be restricted to a snap-on, screw-off closure system in which the cap and container are first oriented relative to one another.

PREFERRED OPERATION

Before applying the caps to the container, the foil seal discs 78 are inserted into the closure and positioned beneath the top 54 of the cap where it is retained in place by the threads 64. If the closure is formed with a recessed portion 85, the foil disc is oriented with the tab 80 located in the recessed portion 85. The foil discs 78 may be inserted into the closure by the manufacturer of the cap. Alternatively, the foil discs may be as applied to the neck part of the capping process.

Figure 11:
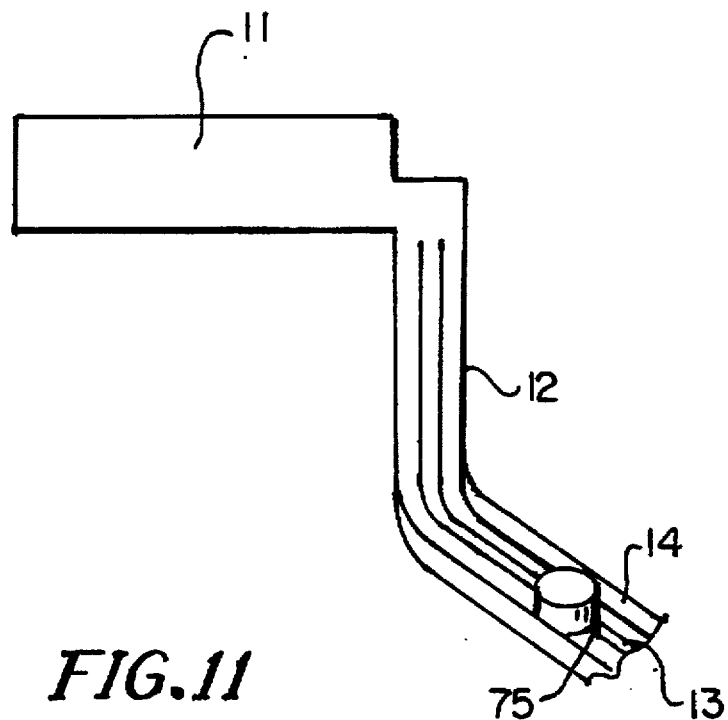
FIG. 11 is a fragmentary plan view of a capping machine, showing a cap positioned within the chute.

After the container has been filled, it is transported through a capping machine. The structure of capping machines is well known in the bottling art. As is well understood in the art, and in a manner similar to that whereby push-on, pull-off caps are applied, caps 21 are fed one at a time out of a bowl 11 in the capping machine along a chute 12 (FIG. 11). One type of chute 12 is formed with a space 13 between parallel rails 14, with tear tab 75 orienting the caps for uniform discharge in a pre-determined orientation relative to the containers passing therebelow by fitting into the space 13 between the rails 14. Preferably each container 25 has a non-circular cross section, some other variation from a round shape, such as the rectangular shape shown in FIG. 12, or some other orientation means which permits the container to be oriented relative to cap 21. The container 25 travels along a conveyer belt 16 below the capping machine (FIG. 12). Guide rails 17 adjacent the conveyor belt 16 directionally align the non-circular cross section of the container 25 relative to the tear tab 75 of the cap. If one of the recessed portions 88 is not aligned with the tab 80 of seal disc 78, the container may be automatically or manually rotated to properly position the cap relative to the container. Thus, in this present embodiment, the cap 21 and neck 22 may be conveniently oriented relative to one another by the conventional capping machine and conveyor belt system. Because of the relative orientation, tab 80 is aligned with recessed portion 88. Threads 29 and 64 are in vertical alignment, ensuring full thread engagement and complete interengagement of the teeth 51 and 68. In other embodiments, the teeth 51 and 68 need not be vertically aligned.

An axially downward force is applied to the cap, pushing the cap onto the neck without externally imposed relative rotation of the cap and container. Threads 64a and 64b slip over threads 29a and 29b, the slanted surfaces of the neck threads facilitating such movement. The cap is sufficiently resilient so that it expands outward to permit the threads to slip. In a preferred form of the present invention, the recessed portion 85 of the cap and the recessed portion 88 of the neck are substantially aligned and the tab is inserted into the space between the neck stretch 28 and the upper skirt 56. In other modifications, the tab is positioned in recessed portion 88 and urged toward the exterior of neck stretch 28. As cap 21 seats on the neck, teeth 68 fall behind teeth 51, providing interengagement between teeth 51 and teeth 68. After the cap has been fully seated on neck 22, it may not be removed without providing evidence of tampering. The interengagement between teeth 51 and 68 prevent unscrewing of the cap from the container, while the interengagement between the threads prevents lifting of cap 21 off neck 22.

As is apparent from the foregoing discussion, the present invention provides a tamper-evident foil lined closure for a container. The closure does not require the use of a secondary or back-up liner to prevent the foil tab from adhering to the container. Instead, in the various modifications of the present invention the closure, neck and seal disc are formed to substantially inhibit adherence of the seal tab to the interior of the closure or the exterior of the neck. Eliminating the need for a second liner substantially reduces the cap manufacturing and assembly costs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In combination, a container having a neck and a container closure, said neck being of the type having an upper opening, a terminal lip surrounding said opening, a neck stretch depending from said lip, said neck stretch having an exterior, and at least one first helical engagement means formed on said exterior of said neck stretch, said closure being of the type having a top, said top having an underside, an upper skirt depending from said top, said upper skirt having an interior, and at least one second helical engagement means formed on said interior of said upper skirt shaped to engage said first helical engagement means, the improvement in said combination comprising, said neck having at least one vertically extending first recessed portion defined by at least one interruption in said first helical engagement means, said closure having a vertically extending second recessed portion defined by at least one interruption in said second helical engagement means, said second recessed portion and said first recessed portion being substantially aligned to define a space between said interior of said upper skirt and said exterior of said neck stretch, and a seal disc below said top of said closure covering said opening and substantially sealing with said lip, said seal disc having a tab extending therefrom for removal of said seal disc from said neck, said tab being positioned in said space defined by said first and second recessed portions when said closure is seated on said neck.

2. The combination of claim 1 wherein, said neck has two diametrically opposed first recessed portions, said second recessed portion being substantially aligned with one of said first recessed portions.

3. The combination of claim 1 wherein, said second helical engagement means is shaped to urge said tab into said first recessed portion when said closure is removed from said neck.

4. The combination of claim 1 wherein, said underside of said top has a rib projecting therefrom, said rib retaining said seal disc against said lip for the formation of a seal between said seal disc and said lip.

5. The combination of claim 1 wherein, said seal disc is a foil disc having a heat sensitive adhesive provided on one surface thereof, said heat sensitive adhesive sealing said foil disc to said lip upon the application of heat to said heat sensitive adhesive after said closure is applied to said neck.

6. The combination of claim 1 wherein, said closure is resilient and said first and second helical engagement means are shaped to slip past one another upon direct axial downward movement of said closure relative to said neck and then interengage without rotation of said closure relative to said neck.

7. The combination of claim 1 wherein, said closure includes a lower skirt below said upper skirt and frangible means connecting said lower skirt to said upper skirt, and further comprising means for removing said lower skirt from said closure.

8. The combination of claim 1, further comprising orientation means on at least one of said closure and said container for orienting said closure relative to said container with said first recessed portion and said second recessed portion substantially aligned.

9. The combination of claim 1 wherein, said neck includes first tamper-evidencing means and said closure includes second tamper-evidencing means, one of said first and second tamper-evidencing means being frangible, said first and second tamper-evidencing means being shaped and positioned to interengage once said closure is seated on said neck.

10. The combination of claim 9 wherein, said first tamper-evidencing means includes at least one external tooth formed on said neck and said second tamper-evidencing means includes at least one internal tooth formed on said closure, said at least one external tooth and said at least one internal tooth being shaped to interengage when said closure is seated on said neck.

11. The combination of claim 9 wherein, said second tamper-evidencing means includes a lower skirt below said upper skirt and frangible means connecting said lower skirt and said upper skirt together.

12. In combination, a container having a neck and a container closure, said neck having an upper opening, a lip surrounding said opening, a neck stretch depending from said lip, said neck stretch having an exterior, and at least one first helical engagement means formed on said exterior of said neck stretch, said closure having a top, said top having an underside, an upper skirt depending from said top, said upper skirt having an interior, and at least one second helical engagement means formed on said interior of said upper skirt, said first and second helical engagement means being shaped to slip past one another without rotation of said closure relative to said neck and interengage when said closure is applied to said neck, the improvement in said combination comprising, said neck having at least two vertically extending recessed portions, each of said recessed portions being defined by at least one interruption in said first helical engagement means, said closure having a seal disc below said top formed for covering said opening and substantially sealing with said lip after said closure is applied to said neck, said seal disc having a peripheral edge and a tab for removal of said seal disc from said neck, said tab depending from said peripheral edge proximate said interior of said upper skirt prior to application of said cap to said neck, and first orientation means on said container and second orientation means on said closure for orienting said closure relative to said neck with said tab and one of said recessed portions substantially aligned, said tab being at least partially disposed in said one of said recessed portions when said closure is applied to said neck.

13. The combination of claim 12 wherein, said closure includes a vertically extending recessed closure portion defined by at least one interruption in said second helical engagement means, said recessed closure portion being substantially aligned with one of said recessed portions on said neck when said closure is seated on said neck, said tab being positioned in at least one of said recessed closure portion and the aligned one of said recessed portions on said neck.

14. The combination of claim 12 wherein, said first orientation means comprises at least a portion of said container having a non-circular cross section.

15. The combination of claim 12 wherein, said second orientation means is positioned diametrically opposite said tab.

16. The combination of claim 12 wherein, said closure includes a lower skirt and frangible means frangibly connecting said lower skirt and said upper skirt together, said second orientation means comprising a tear tab which may be gripped by the user to separate said lower skirt from said upper skirt.

17. The combination of claim 12 wherein, said seal disc is a foil disc.

18. The combination of claim 12 wherein, said seal disc includes a heat sensitive coating applied to one surface of said seal disc, said heat sensitive coating substantially sealing said seal disc to said lip upon heating said heat sensitive coating after said closure is applied to said neck.

19. The combination of claim 12 wherein, said neck includes first tamper-evidencing means and said closure includes second tamper-evidencing means, one of said first tamper-evidencing means and said second tamper-evidencing means being frangible, said first and second tamper-evidencing means being shaped and positioned to interengage when said closure is seated on said neck.

20. The combination of claim 12 wherein, said lip comprises an inturned lip flange at said opening, said seal disc substantially sealing against said lip flange.

21. The combination of claim 20 wherein, said underside of said top has a rib projecting therefrom, said rib pressing said seal disc against said lip flange when said closure is applied to said neck.

22. A container having a neck for use with a container closure having a top, an upper skirt depending from said top, said upper skirt having an interior, and at least one first helical engagement means formed on said interior of said upper skirt, a seal disc below said top formed for covering and substantially sealing with said neck after said closure is applied to said neck, said seal disc having a peripheral edge and a tab for removal of said seal disc from said neck, said tab depending from said peripheral edge proximate said interior of said upper skirt prior to application of said closure to said neck, and first orientation means, said neck having an upper opening, a lip surrounding said opening, a neck stretch depending from said lip, said neck stretch having an exterior, and at least one second helical engagement means formed on said exterior of said neck stretch, said second helical engagement means being shaped to slip past and engage said first helical engagement means when said closure is applied by moving said closure in a direct, axially downward direction relative to said neck, the improvement in said container comprising at least two vertically extending recessed portions, each of said recessed portions being defined by at least one interruption in said second helical engagement means, and second orientation means on said container for orienting said neck relative to said closure such that when said closure is applied to said neck, said tab and one of said recessed portions are substantially aligned and said tab is positioned in said one of said recessed portions.

23. The container of claim 12 wherein, said recessed portions are diametrically opposed.

24. The container of claim 22 wherein, said second orientation means comprises at least a portion of said container having a non-circular cross section.

25. The container of claim 22 wherein, said second orientation means is configured for orienting said neck relative to a closure having a recessed closure portion defined by an interruption in said first helical engagement means to substantially align said one of said recessed portions with said recessed closure portion.

26. The container of claim 22 wherein, said lip comprises an inturned lip flange at said opening, said lip flange providing a sealing surface for substantially sealing said seal disc against said neck.

27. The container of claim 22 wherein, said closure includes first tamper-evidencing means and said neck includes second tamper-evidencing means, said second tamper-evidencing means being shaped to interengage said first tamper-evidencing means when said closure is applied to said neck.

28. The container of claim 27 wherein, said second tamper-evidencing means comprises at least one external tooth on said neck.

29. A closure for use with a container having a neck having an upper opening, a lip surrounding said opening, a neck stretch portion depending from said lip, said neck stretch portion having an exterior, a plurality of first helical engagement means formed on said exterior of said neck portion, said closure having a top, an upper skirt portion depending from said top, said upper skirt portion having an interior, a plurality of second helical engagement means formed on said interior of said upper skirt portion shaped to mate with said first helical engagement means for retaining said closure on said neck, said second helical engagement means being shaped and dimensioned to slip past and engage said first helical engagement means to retain said closure on said neck when said closure is applied to said neck without rotation of said closure relative to said neck to seat said closure on said neck so that said closure may not be removed without unscrewing said closure, said second helical engagement means having a linear thread density of at least twelve threads per inch, and a seal disc positioned beneath said top prior to application of said closure to said neck and held within said closure by said second helical engagement means said seal disc being formed for covering said opening and substantially sealing with said neck after said closure is applied thereto, said seal disc having a tab for removal of said seal disc from said neck to uncover said opening, said tab depending from said seal disc proximate said interior of said upper skirt portion, said tab having a terminus below at least a portion of said second helical engagement means, said closure being characterized by the absence of a liner disc separating said seal disc from said underside of said top.

30. The closure of claim 29 wherein, said interior of said upper skirt portion has a recessed portion defined by at least one interruption in said second helical engagement means, and said tab is positioned proximate said recessed portion such that when said closure is seated on said neck, said tab is held within said recessed portion between said interior of said upper skirt portion and said exterior of said neck stretch portion.

31. The closure of claim 29 wherein, p1 said top has an underside and an annular rib formed on said underside, said annular rib retaining said seal disc against said neck around said opening for the formation of a seal between said seal disc and said neck.

32. The closure of claim 29 wherein, said seal disc is a foil disc having a heat sensitive adhesive provided on one surface thereof, said heat sensitive adhesive sealing with said neck upon the application of heat after said closure is applied to said neck.

33. In combination, the closure of claim 29 and a neck having an upper opening, a lip surrounding said opening, a neck stretch portion depending from said lip, said neck stretch portion having an exterior, and a plurality of first helical engagement means formed on said exterior of said neck portion, said closure being oriented relative to said neck such that when said closure is applied to said neck without rotation of said closure relative to said neck, said closure is moved to a final position in which said first helical engagement means and said second helical engagement means are fully engaged.

34. A closure for use with a container having a neck having an upper opening, a lip surrounding said opening, a neck stretch portion depending from said lip, said neck stretch portion having an exterior, a plurality of first helical engagement means formed on said exterior of said neck stretch portion, and first tamper-evidencing means, said closure having a top, said top having an underside, an upper skirt portion depending from said top, said upper skirt portion having an interior, a plurality of second helical engagement means formed on said interior of said upper skirt portion shaped to mate with said first helical engagement means, and second tamper-evidencing means, said second helical engagement means being shaped and dimensioned so that upon direct, axial downward movement of said closure relative to said neck without externally imposed relative rotation of said closure and said neck, said second helical engagement means slips past and engages said first helical engagement means and said closure seats on said neck so that said closure cannot be removed from said neck without unscrewing said closure, said second helical engagement means having a linear thread density of at least twelve threads per inch, and a seal disc positioned underneath said top prior to application of said closure to said neck and held within said closure by said second helical engagement means, said seal disc surrounding said opening and substantially sealing with said neck after said closure is seated on said neck, said seal disc being substantially exposed to said underside of said top and having a peripheral edge and a tab depending from said peripheral edge proximate said interior of said upper skirt portion for removal of said seal disc from said neck, said tab having a terminus below at least a portion of said second helical engagement means, whereby said tab is positioned to prevent adherence of said tab to said underside of said top or to said interior of said upper skirt portion when said seal disc is applied to said lip and substantially sealed thereto.

35. The closure of claim 34 wherein, said closure includes a recessed portion formed in said interior of said upper skirt portion, which recessed portion is defined by at least one interruption in said second helical engagement means, and said tab is positioned proximate said recessed portion such that when said closure is seated on said neck, said tab is held within said recessed portion between said interior of said upper skirt portion and said first helical engagement means.

36. The closure of claim 34 wherein, said neck includes a peripheral lip flange surrounding said opening, and said closure has a rib formed on said underside of said top, said rib pressing said seal disc against said lip flange for the formation of a seal between said seal disc and said lip flange when said closure is applied to said neck.

37. In combination, the closure of claim 34 and a neck having an upper opening, a lip surrounding said opening, a neck stretch portion depending from said lip, said neck stretch portion having an exterior, a plurality of first helical engagement means formed on said exterior of said neck portion, and first tamper-evidencing means, said closure being oriented relative to said neck such that when said closure is applied to said neck without rotation of said closure relative to said neck, said closure is moved to a final position in which said first helical engagement means and said second helical engagement means are fully engaged.

38. In combination, a container having a neck and a container closure, said neck having an upper opening, a lip surrounding said upper opening, a neck stretch portion depending from said lip, said neck stretch portion having an exterior, and first tamper-evidencing means, said closure having a top, said top having an underside, an upper skirt portion depending from said top, said upper skirt portion having an interior, and second tamper-evidencing means, said neck having a plurality of first helical engagement means formed on said exterior of said neck stretch portion and said closure having a plurality of second helical engagement means formed on said interior of said upper skirt portion for retaining said closure on said neck, said closure being resilient and said first and second helical engagement means being shaped and dimensioned to slip past one another and interengage to retain said closure on said neck upon direct axial downward movement of said closure relative to said neck without rotation of said closure relative to said neck to seat said closure on said neck so that said closure may not be removed from said neck without unscrewing said closure, said first and second helical engagement means each having a linear thread density of at least twelve threads per inch, one of said first tamper-evidencing means and said second tamper-evidencing means being frangible, said first and second tamper-evidencing means being shaped and positioned to interengage once said closure is seated on said neck upon said direct axial downward movement, and a seal disc positioned underneath said top prior to application of said closure to said neck and held within said closure by said second helical engagement means said seal disc covering said opting and substantially sealing with said neck after said closure is applied thereto, said seal disc having a tab depending from said seal disc proximate said interior of said upper skirt portion for removal of said seal disc from said neck, said tab having a terminus below at least a portion of said second helical engagement means, whereby said tab is positioned to prevent adherence of said tab to said underside of said top or to said interior of said upper skirt portion when said seal disc is applied to said lip and substantially sealed thereto.

39. The combination of claim 38 wherein, said second helical engagement means includes at least one interruption providing said interior of said upper skirt portion with a recessed portion formed for receiving said tab, and said tab is positioned proximate said recessed portion, whereby said tab is held within said recessed portion between said interior of said upper skirt portion and said exterior of said neck stretch portion when said closure is seated on said neck.

40. The combination of claim 38 in which said closure is oriented relative to said neck such that when said closure is applied to said neck without rotation of said closure relative to said neck, said closure is moved to a final position in which said first helical engagement means and said second helical engagement means are fully engaged.

41. The combination of claim 38 wherein, said neck has a peripheral lip flange surrounding said opening, and said seal disc substantially seals with said lip flange after said closure is applied to said neck.

42. The combination of claim 41 wherein, said closure includes an annular rib on said underside of said top, said annular rib retaining said seal disc against said lip flange for the formation of a seal between said seal disc and said lip flange after said closure is applied to said neck.

43. The combination of claim 38 wherein, said seal disc is a foil disc.

44. The combination of claim 43 wherein, said foil disc has a coating applied to one surface thereof, said coating being of a heat sensitive material such that upon heating, said coating forms a seal between said seal disc and said lip flange.

45. A closure for use with a container having a neck having an upper opening, a lip surrounding said opening, a neck stretch portion depending from said lip, said neck stretch portion having an exterior, a plurality of first helical engagement means formed on said exterior of said neck stretch portion said closure having a top, an upper skirt depending from said top, said upper skirt having an interior, a plurality of second helical engagement means formed on said interior of said upper skirt for retaining said closure on said neck, said second helical engagement means being shaped and dimensioned to slip past and engage said first helical engagement means to retain said closure on said neck when said closure is applied to said neck by moving said closure in a direct, axially downward direction relative to said neck, said interior of said upper skirt having a recessed portion defined by at least one interruption in said second helical engagement means and a seal disc beneath said top, said seal disc formed for covering said opening and substantially sealing with said neck after said closure is applied thereto, said seal disc having a peripheral edge and a tab depending from said peripheral edge of said seal disc proximate said interior of said upper skirt for removal of said seal disc from said neck to uncover said opening, said tab being positioned proximate said recessed portion such that when said closure is seated on said neck, said tab is held within said recessed portion between said interior of said upper skirt and said exterior of said neck stretch portion, said closure being characterized by the absence of a liner disc separating said seal disc from said underside of said top.

46. In combination, the closure of claim 45 and a neck having an upper opening, a lip surrounding said opening, a neck stretch portion depending from said lip, said neck stretch portion having an exterior, and a plurality of first helical engagement means formed on said exterior of said neck portion, said closure being oriented relative to said neck such that when said closure is applied to said neck without rotation of said closure relative to said neck, said closure is moved to a final position in which said first helical engagement means and said second helical engagement means are fully engaged.

47. In combination, a container having a neck and a container closure, said neck having an upper opening, a neck stretch portion depending from said opening, said neck stretch portion having an exterior, and first tamper-evidencing means, said closure having a top, said top having an underside, an upper skirt portion depending from said top, said upper skirt portion having an interior, and second tamper-evidencing means, said neck having a plurality of first helical engagement means formed on said exterior of said neck stretch portion and said closure having a plurality of second helical engagement means formed on said interior of said upper skirt portion for retaining said closure on said neck, said closure being resilient and said first and second helical engagement means being shaped and dimensioned to slip past one another and interengage to retain said closure on said neck upon direct axial downward movement of said closure relative to said neck without relative rotation of said closure and said neck to seat said closure on said neck so that said closure cannot be removed from said neck without unscrewing said closure, said first and second helical engagement means having a linear thread density of at least twelve threads per inch, one of said first tamper-evidencing means and said second tamper-evidencing means being frangible, said first and second tamper-evidencing means being shaped and positioned to interengage once said closure is seated on said neck upon said direct axial downward movement, a seal disc positioned underneath said top, said seal disc covering said opening and substantially sealing with said neck after said closure is applied thereto, said seal disc having a tab for removal of said seal disc from said neck, said second helical engagement means including at least one interruption providing said interior of said upper skirt portion with a recessed portion formed for receiving said tab, and said tab depending from said seal disc proximate said recessed portion, whereby said tab is held within said recessed portion between said interior of said upper skirt portion and said exterior of said neck stretch portion when said closure is seated on said neck, whereby said tab is positioned to prevent adherence of said tab to said underside of said top or to said interior of said upper skirt portion when said seal disc is applied to said lip and substantially sealed thereto.

48. The combination of claim 47 which said closure is oriented relative to said neck such that when said closure is applied to said neck without rotation of said closure relative to said neck, said closure is moved to a final position in which said first helical engagement means and said second helical engagement means are fully engaged.

49. In combination, a container having a neck and a container closure, said neck having an upper opening, a lip surrounding said upper opening, a neck stretch portion depending from said lip, said neck stretch portion having an exterior, said closure having a top, said top having an underside, an upper skirt portion depending from said top, said upper skirt portion having an interior, said neck having a plurality of first helical engagement means formed on said exterior of said neck stretch and said closure having a plurality of second helical engagement means formed on said interior of said upper skirt portion for retaining said closure on said neck, said closure being resilient and said first and second helical engagement means being shaped and dimensioned to slip past one another and interengage to retain said closure on said neck upon direct axial downward movement of said closure relative to said neck without rotation of said closure relative to said neck to seat said closure on said neck so that said closure cannot be removed from said neck without unscrewing said closure, said first and second helical engagement means having a linear thread density of at least twelve threads per inch, a seal disc positioned underneath said top prior to application of said closure to said neck and held within said closure by said second helical engagement means, said seal disc covering said opening and substantially sealing with said neck after said closure is applied thereto, said seal disc having a tab depending from said seal disc proximate said interior of said upper skirt portion for removal of said seal disc from said neck, said tab having a terminus below at least a portion of said second helical engagement means, whereby said tab is positioned to prevent adherence of said tab to said underside of said top or to said interior of said upper skirt portion when said seal disc is applied to said lip and substantially sealed thereto.

* * * * *